United States Patent [19]

Bourgeon et al.

[11] Patent Number: 5,229,065
[45] Date of Patent: Jul. 20, 1993

[54] METHOD AND DEVICE FOR MEASURING THE TEMPERATURE OF THE PRIMARY COOLANT FLUID OF NUCLEAR REACTOR

[75] Inventors: Claude Bourgeon, Cremieu; Michel Boulet, Cormeilles En Parisis; Emmanueul Tardy, Lyons; Daniel Demonte, Saint Etienne sur La Chalarolle, France

[73] Assignee: Framatome, Courbevoie, France

[21] Appl. No.: 814,579

[22] Filed: Dec. 30, 1991

[30] Foreign Application Priority Data

Dec. 28, 1990 [FR] France ............... 90-16493

[51] Int. Cl.⁵ .......................... G21C 17/02
[52] U.S. Cl. ........................ 376/247; 376/245;
73/863.33; 73/863.51; 73/863.52; 73/863.81;
136/230; 136/231; 136/232; 374/141; 374/147;
374/148; 374/137; 374/208
[58] Field of Search .............. 376/247, 245;
73/863.81, 863.33, 863.41, 863.51, 863.52;
374/147, 148, 208, 141, 144, 138, 137; 136/230,
231, 232, 233, 234, 202, 201

[56] References Cited

U.S. PATENT DOCUMENTS

| | | | |
|---|---|---|---|
| 3,331,247 | 7/1967 | Toepell | 73/351 |
| 3,618,386 | 11/1971 | Black | 73/340 |
| 4,061,036 | 12/1977 | Legille | 73/421.5 A |
| 4,131,756 | 12/1978 | Smith | 136/230 |
| 4,186,605 | 2/1980 | Bourigault | 73/341 |
| 4,553,432 | 11/1985 | Barlian et al. | 73/336 |
| 4,580,910 | 4/1986 | Corwin | 374/144 |
| 4,670,212 | 6/1987 | Geoffray et al. | 376/247 |
| 4,778,538 | 10/1988 | Lyman | 136/230 |
| 5,106,203 | 4/1992 | Napoli et al. | 374/144 |

FOREIGN PATENT DOCUMENTS

| | | |
|---|---|---|
| A152361 | 8/1986 | European Pat. Off. . |
| a299703 | 1/1989 | European Pat. Off. . |
| 734702 | 8/1955 | United Kingdom . |
| 1108186 | 4/1968 | United Kingdom ........ 374/148 |
| 2100003A | 12/1982 | United Kingdom ........ 374/141 |

Primary Examiner—Donald P. Walsh
Assistant Examiner—Chrisman D. Carroll
Attorney, Agent, or Firm—Pollock, Vande Sande & Priddy

[57] ABSTRACT

Coolant fluid is sampled from a substantially horizontal part of the hot leg (16) of the primary circuit at at least three points (19, 20, 21) distributed at the periphery of a straight section of the hot leg (16), in such a way that at least one of the sampling points, or lower sampling point, is situated beneath the axis (17) of the hot leg (16). The temperature of the coolant water sampled at each of the sampling points (19, 20, 21) is measured at its outlet from the hot leg (16) and the coolant fluid is reintroduced into the hot leg (16) at a point situated in a position substantially diametrically opposite, with respect to one of the lower sampling points (20, 21), on the straight section of the hot leg (16). The sampling devices (19, 20, 21) connected by pipes (24, 25, 26) to a reintroduction element (22) are arranged at the periphery of the hot leg (16). The sampling devices (19, 20, 21) preferably consist of a glove finger penetrating into the hot leg (16) and comprising holes for the passage of the coolant water into the inner bore of the glove fingers which communicates with the bore of a projection (34) arranged on the outside of the hot leg (16) and to which the connecting pipe (24, 25, 26) is joined.

10 Claims, 3 Drawing Sheets

METHOD AND DEVICE FOR MEASURING THE TEMPERATURE OF THE PRIMARY COOLANT FLUID OF NUCLEAR REACTOR

FIELD OF THE INVENTION

The invention relates to a method and a device for measuring the temperature of the primary coolant fluid of a nuclear reactor.

BACKGROUND OF THE INVENTION

Nuclear reactors such as pressurized-water nuclear reactors, comprise a pressure vessel in which is arranged the core of the reactor consisting of fuel assemblies and a primary circuit comprising at least one loop on which is arranged a steam generator, inside which the primary coolant fluid of the reactor heats up and vaporizes the feedwater. Each of the loops of the primary circuit comprises very thick large-diameter pipes in which the primary coolant fluid circulates. One of the pipes, or the hot leg, connects the pressure vessel to the steam generator and ensures the transfer of the primary fluid, heated up in contact with the core, into the primary part of the steam generator.

Another pipe, or the cold leg, ensures the return of the coolant fluid into the pressure vessel after having passed through the steam generator.

In order to control and monitor the operation of nuclear reactors, it is necessary to measure the temperature of the primary fluid, which temperature must of necessity be maintained within a predetermined range in order to ensure satisfactory operation of the nuclear reactor.

One of the most widely used methods consists in sampling coolant fluid from various legs of the primary circuit, in mixing the samples obtained and in measuring the temperature of the samples of fluid after they have been mixed. These temperature measurements are carried out on the sampling lines or in headers situated at points remote from the primary pipes.

The sampling circuit comprises small-diameter pipes, the total length of which can be of the order of 60 m. Furthermore, the sampling circuit is complex and comprises numerous gates and flaps in the region of which leaks can occur, resulting in the environment of the nuclear reactor being contaminated. Decontamination procedures must then be implemented which may prove to be lengthy and costly.

Furthermore, the maintenance operatives who work on the sampling circuit may be subjected to a high level of radiation.

Devices are also known for measuring the temperature of a coolant fluid inside the primary pipes which comprise a probe, the support body of which traverses the wall of the primary pipe. These devices, termed scoops, can comprise an element in the shape of a glove finger penetrating into the primary duct and inside which the temperature-measuring probe is placed. The portion of the glove finger inside the primary pipe is perforated so that the coolant fluid can circulate in contact with the probe.

The temperature of the coolant fluid of a nuclear reactor is not homogeneous in the various sections of the primary pipes and, in particular, in the hot legs where stratification of this coolant fluid takes place.

Methods for measuring the temperature of the coolant fluid must take account of these phenomena in order for the measurements obtained to be genuinely representative and to enable efficient monitoring and control of the nuclear reactor to take place.

SUMMARY OF THE INVENTION

The object of the invention is therefore to provide a method for measuring the temperature of the primary coolant fluid of a nuclear reactor comprising a pressure vessel enclosing the core of the reactor and a primary circuit comprising at least one loop on which is arranged a steam generator and which comprises pipes in which the primary coolant fluid of the reactor circulates. One of the pipes or the hot leg, connects the pressure vessel to the steam generator, and another pipe, or the cold leg, insures the return of the coolant fluid coming from the steam generator into the pressure vessel. This method, which is simple to implement, makes it possible to obtain representative temperature measurements and avoids to a very large extent risks of radiation by the coolant fluid.

To this end, coolant fluid is sampled from a substantially horizontal part of the hot leg at at least three points distributed at the periphery of a straight section of the hot leg, in such a way that at least one of the sampling points, or lower sampling point, is situated beneath the axis of the pipe, the temperature of the coolant water sampled at each of the sampling points is measured at its outlet from the hot leg, and the coolant fluid is reintroduced into the hot leg at a point situated in a position substantially diametrically opposite, with respect to a lower sampling point, on the straight section of the hot leg.

The invention also relates to a measuring device making it possible to implement the method according to the invention.

BRIEF DESCRIPTION OF THE DRAWINGS

In order to make the invention readily comprehensible, an embodiment of a device for implementing the method according to the invention, in the case of pressurized-water nuclear reactor, will now be described by way of example and with reference to the accompanying drawings.

DESCRIPTION OF PREFERRED EMBODIMENT

Figure 1:
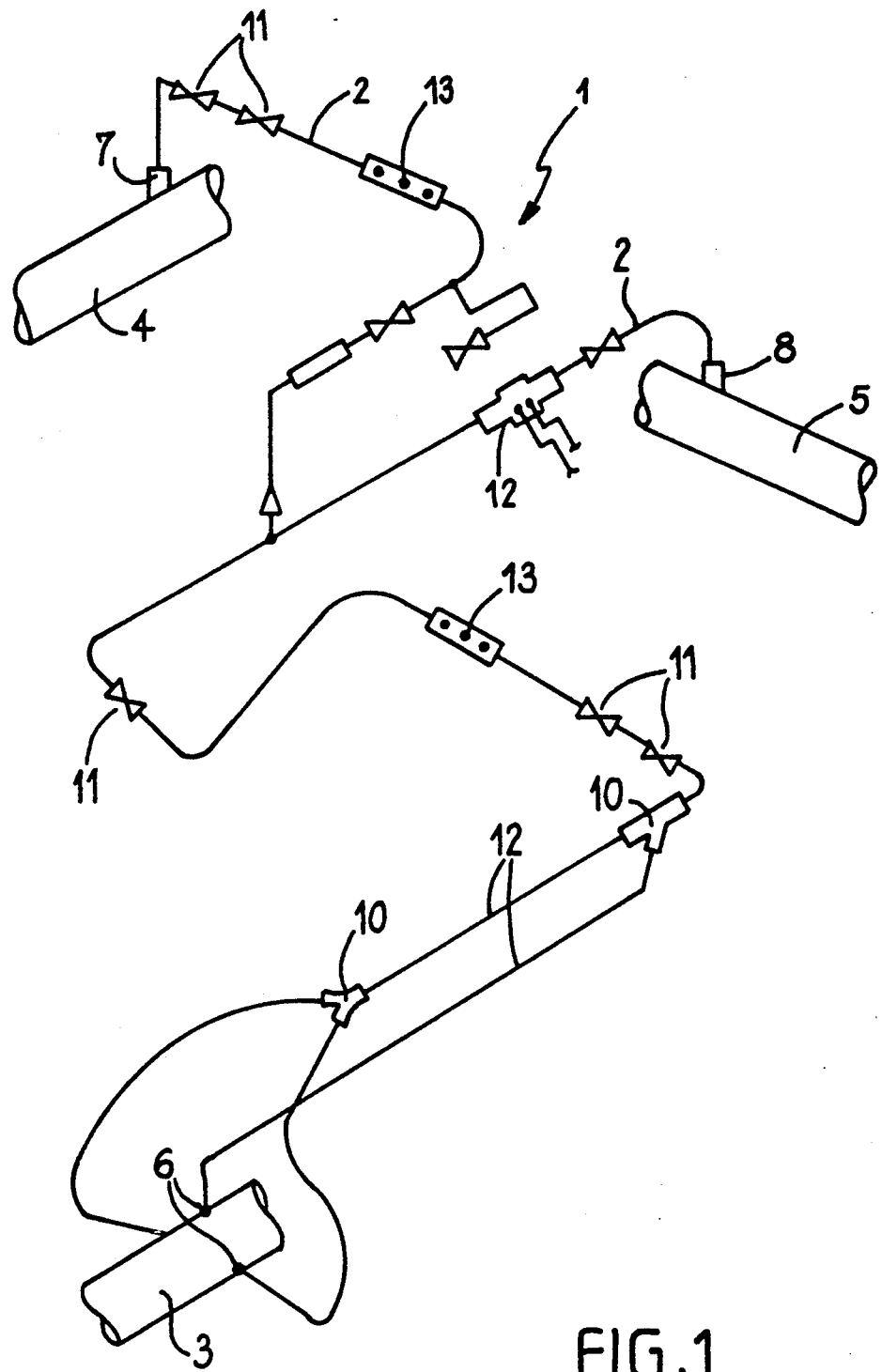
FIG. 1 is a schematic perspective view of a circuit for sampling, and for measuring the temperature of, the primary fluid of a pressurized-water nuclear reactor, according to the prior art.

FIG. 1 shows a prior art circuit 1 for sampling, and for measuring the temperature of, the primary coolant fluid of a pressurized-water nuclear reactor.

The sampling and measuring circuit comprises small-diameter pipes 2 which are connected to a hot leg 3, to a cold leg 4 and to an intermediate leg 5, termed crossover leg, of a loop of the primary circuit of the reactor.

The intermediate leg of a pressurized-water nuclear reactor connects the outlet of the primary part of the steam generator to a primary pump for circulating the coolant fluid in the loop, the delivery part of which is connected to the cold leg 4.

The pipes 2 of the sampling and measuring circuit are connected to the legs 3, 4 and 5 via devices for sampling the coolant fluid from, or for reintroducing the coolant fluid into the primary circuit, traversing the wall of the corresponding primary pipe and generally referred to as scoops.

The pipes 2 of the sampling circuit 1 are connected to the hot leg via three scoops 6 distributed around the pipe constituting the hot leg 3.

The ducts 2 are also connected to the cold leg 4 and to the intermediate leg 5 via scoops 7 and 8 respectively.

The sampling and measuring circuit 1 also comprises couplings 10, gates and flaps 11, headers 12 and measuring probes 13.

The sampling and measuring circuit 1 has a complex structure and the total length of the ducts 2, in the case of a conventional pressurized-water nuclear reactor, can be of the order of 60 m.

As a result, there are risks of leakage and of radioactive contamination of the environment and of the operatives charged with the maintenance of the circuit.

Figure 2:
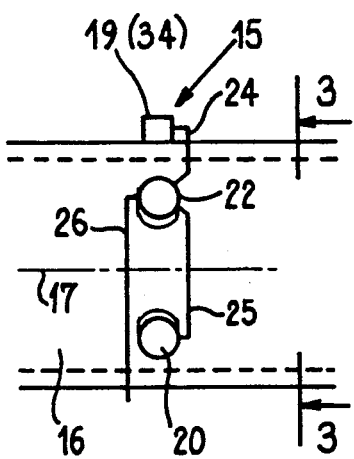
FIG. 2 is a schematic side elevation of part of a device for implementing the method according to the invention, which part is situated on a hot leg of the reactor.

A measuring device 15 according to the invention can be seen in FIG. 2, arranged on a part of a hot leg 16 of the primary circuit of a pressurized-water nuclear reactor, which hot leg has a substantially horizontal axis 17.

Figure 3:
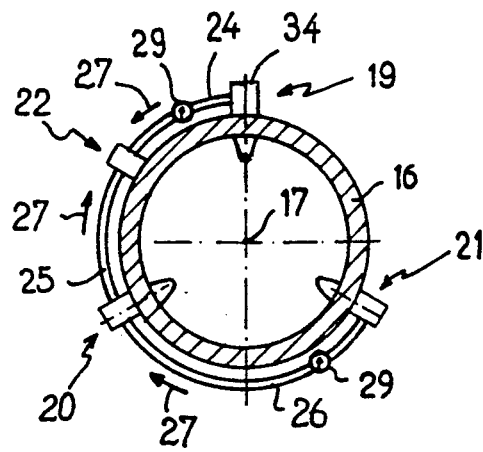
FIG. 3 is a section view along line 3—3 of FIG. 2.

As can be seen in FIGS. 2 and 3, the measuring device 15 comprises three scoops 19, 20, 21 for sampling coolant fluid and an element 22 for reintroducing the sampled coolant fluid into the primary pipe 16.

The sampling scoops 19, 20 and 21 are spaced by 120° about the axis 17 of the pipe 16, in a substantially vertical, straight section of this pipe.

The scoops 20 and 21 are arranged beneath the axis 17 of the pipe 16 and the scoop 19, at the upper part of the straight section of the pipe 16.

The scoops 19, 20 and 21 are equipped with temperature-measuring probes, as will be explained hereinbelow.

The reintroduction device 22 is placed in a position diametrically opposite to the scoop 21 situated beneath the axis of the pipe 16 and in the vicinity of its lower part.

Each of the scoops, 19, 20, 21 is connected to the reintroduction element 22 via a small-diameter pipe, 24, 25 and 26, respectively.

The water sampled at the scoops 19, 20 and 21 circulates outside the duct 16 in the pipes 24, 25 and 26 and is reintroduced into the pipe 16 by the element 22, as indicated by the arrows 27 shown in FIG. 3.

The whole of the device 15 having the shape of a portion of a ring is arranged around the pipe 16.

Figure 4:
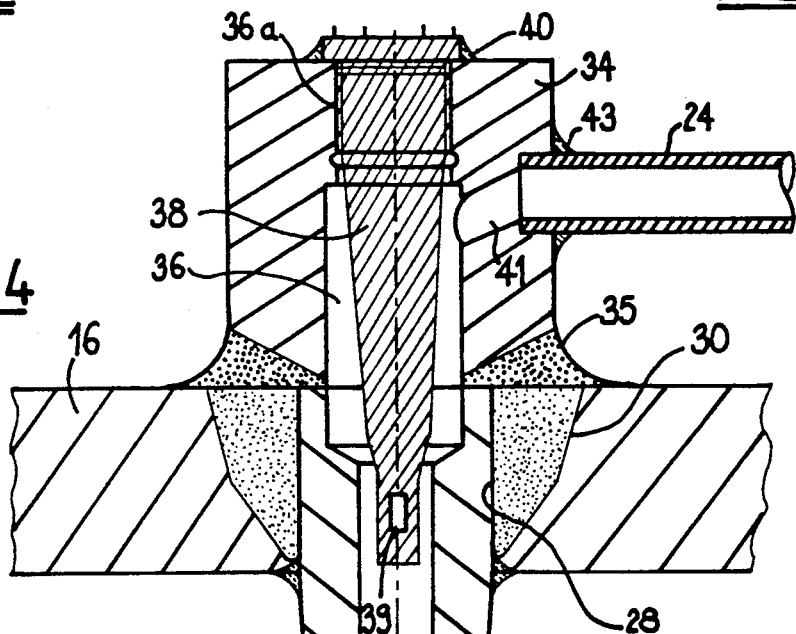
FIG. 4 is a view in axial section of an element used in the device according to the invention for measuring the temperature of the coolant fluid.

A scoop such as 19 can be seen in FIG. 4, fixed in an opening 28 traversing the wall of the pipe 16. The scoop 19, in the shape of a glove finger, is fixed by a weld seam 30 in the wall of the pipe 16.

The portion of scoop 19 situated inside the pipe 16 is pierced by openings 31 opening out into the axial central channel 32.

A projection 34 is fixed to the outer surface of the pipe 16 by a weld seam 35 in such a way that the internal bore 36 of the projection 34 is in the extension of the bore 32 of the scoop 19.

The bore of the projection 34 and the upper part of the bore 32 are machined so as to receive the support 38 for a temperature-measuring probe 39.

The upper part 36a of the bore 36 is tapped so as to receive a threaded part of the support 38 which is screwed into the tapped part 36a of the bore 36.

A weld seam 40 makes it possible to ensure a sealed joint between the support 38 and the projection 34.

The projection 34 is also pierced in order to form a channel 41 opening out into the bore 36, and a seating receiving the end of the pipe 24 of the device 15 which is fixed by a weld seam 43 to the projection 34 and which is brought into communication with the bore 36 by the channel 41.

The scoops 20 and 21 are formed in the same manner as the scoop 19 and comprise a part in the shape of a glove finger traversing the wall of the duct 16, and a connecting projection to which are fixed respectively the pipe 25 and the pipe 26.

Figure 5:
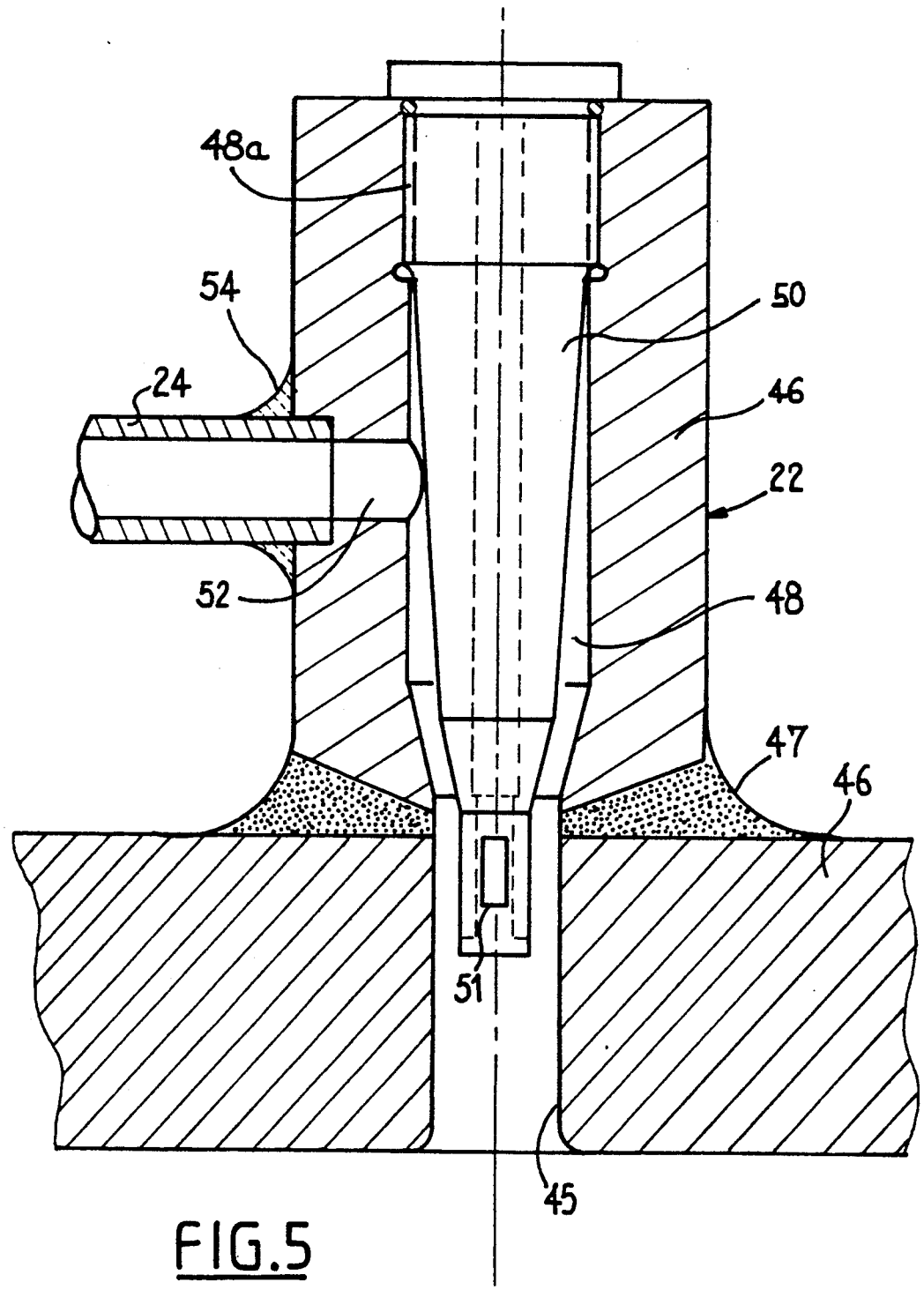
FIG. 5 is a view in axial section of an element enabling the coolant fluid to be reintroduced into a primary pipe, within the scope of the implementation of the method according to the invention.

The element 22 for reintroducing the coolant water into the primary pipe 16 constituting the hot leg can be seen in FIG. 5. The wall of the pipe 16 is traversed by an opening 45, and the element 22 for reintroducing the coolant water consists of a projection 46 fixed by a weld seam 47 to the outer surface of the pipe 16 and comprising a bore 48 arranged in the extension of the bore 45 traversing the wall of the pipe 16.

The bore 48 is machined to a diameter greater than the diameter 45 and comprises a tapped part 48a so as to be able to receive a probe support 50 arranged over the entire length of the bore 48 and comprising an end part of reduced diameter, on which is fixed a temperature probe 51 projecting slightly into the opening 45.

The probe support 50 comprises a threaded end part which is screwed into the tapped opening 48a, and two frustoconical parts joining its threaded end part to its end of reduced diameter.

The support 50 is engaged, by screwing, into the bore 48 and fixed in a sealing fashion on the end of the projection 46 by a weld seam. The sealed joint between the probe support 50 and the projection 46 could also be provided by a seal.

The projection 46 is also traversed by three channels arranged at substantially 120° about its axis, such as the channel 52 opening out into the bore 48, in a space provided in this bore, at the periphery of a frustoconical part of the support 50.

The end of a pipe such as 24 or 25 or 26, joining one of the scoops to the elements 22 for reintroducing the coolant water into the primary duct, is fixed in the region of each of the channels 52.

Each of the pipes such as 24 is fixed in a sealing fashion on the projection 46 by a weld seam such as 54.

The probe support 50 could, optionally, be replaced by a plug closing the part of the bore 48 situated above the channel 52, fixed onto the projection 46 by screwing and by welding.

The temperature probes such as 39 arranged in the scoops 19, 20 and 21, and the temperature probe 51 associated with the projection for reintroducing pressurized water 46, are connected via conducting wires traversing the corresponding probe bodies to a module for processing the signals from the probes, arranged in the control room of the reactor. The signals emitted by the probes are representative of the temperature of the water sampled at the scoops 19, 20 and 21, or of the temperature of the coolant water reintroduced into the primary pipe 16 at the reintroduction element 22, and are collected by the processing module which enables values representative of the temperature of the coolant water of the primary circuit to be obtained.

The mean of the three values obtained from the probe 39 is calculated, which makes it possible to obtain and display a value for the temperature of the coolant water in the hot leg, eliminating some of the effects of stratification of the coolant water in the hot leg which are likely to give rise to errors and disturbances in the measurements.

The mean temperature obtained by the electronic calculation means of the module can be compared with the temperature obtained from the probe 51 which corresponds to the actual mean temperature of the fluid reintroduced into the primary pipe 16 via the pipes 24, 25 and 26, and via the projection 46. Indeed, a certain mixing of the quantities of water sampled at each of the scoops 19, 20 and 21, takes place in the bore 48 of the projection 46. The temperature measured by the probe 51 therefore corresponds to the mean temperature of the coolant water reintroduced into the duct 16.

This comparison makes it possible, to detect any operational anomaly of the device 15 where a substantial discrepancy exists between the two mean values obtained.

Flowmeters such as the flowmeter 29 arranged on each of the ducts 24, 25 and 26 make it possible to check that the fluid is circulating correctly in the ducts of the measuring device 15.

The device 15 therefore makes it possible to effect a certain mixing and homogenization of the coolant fluid so as to obtain a value representative of the temperature of the primary fluid. This mixing and homogenization are necessary to the extent that substantial stratification of the coolant fluid occurs in the hot leg 16 of the primary circuit.

Figure 3A:
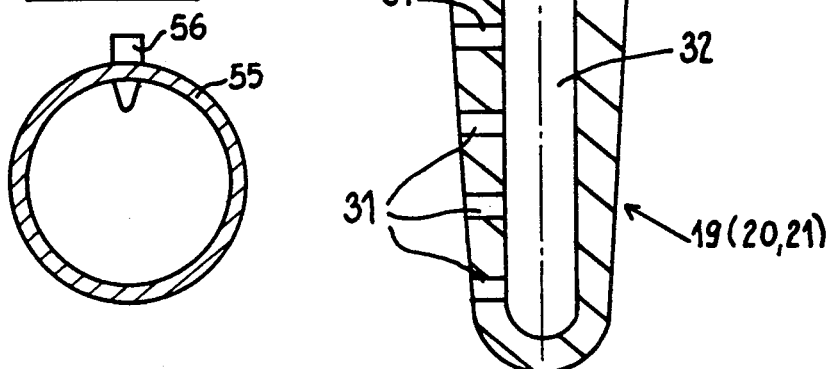
FIG. 3a is a section view, similar to FIG. 3, of part of the device situated on a cold leg of the reactor

In the case of a cold leg or of an intermediate leg such as the leg 55 shown in FIG. 3a, the measurements of the temperature of the coolant water of the primary circuit can be carried out using a single temperature probe arranged in a scoop 56 having openings for the passage of the coolant water in its part arranged inside the pipe 55, or possibly a plurality of aligned probes at the upper part of the pipe.

The values supplied by this probe or these probes are also processed, displayed and taken into account in the control room of the reactor.

In the case of the cold and the intermediate leg no substantial stratification of the fluid occurs, so that measurement of the temperature in the upper part of the pipe is sufficient to obtain a representative value.

The probe 51 of the element 22 for reintroducing the coolant water can be used as an emergency probe if one of the probes associated with a scoop 19, 20 or 21 measuring the outlet temperature of the coolant fluid is faulty.

If the projection 46 of the element 22 for reintroducing the coolant water is closed by a plug, the element 22 then not having a temperature probe, the circuit consisting of the pipes 24, 25 and 26 serves solely to ensure satisfactory mixing of the fluid in the region of the three probes arranged in the scoops 19, 20 and 21, on the outlet of the coolant water.

In all cases, the device according to the invention makes it possible to measure, in a simple manner, the temperature of the coolant water of the reactor in the vicinity of the primary pipes, using a small-sized device with reduced risks of a coolant leakage and of contamination of the environment of the reactor and of the maintenance staff.

The structure and arrangement of the scoops equipped with temperature probes, and of the element for reintroducing the fluid into the primary pipe may be different from that which has been described and illustrated.

The measurement signals emitted by the probes arranged on the hot leg, on the cold leg or on the intermediate leg can be processed in any manner known from the prior art and displayed, or cause alarms to be triggered.

The invention is applied not only to pressurized-water nuclear reactors but also to any nuclear reactor comprising a primary coolant fluid circulating in large-diameter pipes, at least certain parts of which have a substantially horizontal arrangement.

We claim:

1. Method for measuring the temperature of the primary coolant fluid of a nuclear reactor comprising a pressure vessel in which is arranged the core of the reactor and a primary circuit having at least one loop on which is arranged a steam generator, and which comprises pipes (16, 55) in which the primary coolant fluid of the reactor circulates, one of said pipes being a hot leg (16), another of said pipes being a cold leg (55), connecting the pressure vessel to the steam generator, and another pipe, or the cold leg (55), ensuring the return of the coolant fluid coming from the steam generator into the pressure vessel, said method comprising the steps of (a) sampling coolant fluid from a substantially horizontal part of the hot leg (16) at at least three points (19, 20, 21) distributed at the periphery of a straight section of the hot leg (16), in such a way that at least one of the sampling points (20, 21), or lower sampling point, is situated beneath the axis (17) of the hot leg (16);

(b) measuring the temperature of the coolant water sampled at each of the sampling points (19, 20, 21) at its outlet from the hot leg (16); and (c) reintroducing the coolant fluid into the hot leg (16) at a point (22) situated in a position substantially diametrically opposite one of the lower sampling points (20, 21), on the straight section of the hot leg (16).

2. Method according to claim 1, wherein the coolant fluid is sampled at three points (19, 20, 21) arranged at 120° to one another about the axis (17) of the hot leg (16), in a straight section of said hot leg (16).

3. Method according to claim 1, wherein the temperature of the coolant fluid is measured at a point (56) situated in the vicinity of the upper part of the cold leg (55) of the primary circuit.

4. Method according to claim 1, wherein the mean of the temperatures measured at each of the sampling points (19, 20, 21) of the hot leg (16) is calculated by electronic means.

5. Method according to claim 1, wherein the temperature of the coolant water reintroduced into the hot leg (16) is measured at the point situated in a position substantially diametrically opposite one of the lower sampling points (20, 21), and the temperature of the coolant water reintroduced at the reintroduction point (22) is compared with the mean of the temperatures measured at said three sampling points (19, 20, 21).

6. Device for measuring the temperature of the primary coolant fluid of a nuclear reactor comprising a pressure vessel in which is arranged the core of the reactor and a primary circuit having at least one loop on which is arranged a steam generator, and which comprises pipes (16, 55) in which the primary coolant fluid of the reactor circulates, one of said pipes being a hot leg (16), connecting the pressure vessel to the steam generator, and another of said pipes being a cold leg (55), ensuring the return of the coolant fluid coming from the steam generator into the pressure vessel, said device comprising (a) at least three devices for sampling coolant fluid, traversing the wall of a substantially horizontal part of the hot leg (16) and distributed at the periphery of a straight section of said hot leg so that at least one of the sampling devices (20, 21) is situated beneath the axis (17) of the hot leg (16); and (b) an element (22) for reintroducing coolant fluid into the hot leg (16), arranged in a position substantially diametrically opposite one of the sampling devices situated beneath the axis (17) of the hot leg (16) and pipes (24, 25, 26) connecting each of the sampling devices (19, 20, 21) to the reintroduction element (22).

7. Device according to claim 6, wherein each of the sampling devices (19, 20, 21) is in the form of a scoop comprising a part in the form of a glove finger fixed in an opening (28) traversing the wall of the hot leg (16) and having, in its part situated inside the hot leg (16), openings (31) traversing its wall and opening out into a central channel (32), and a projection (34) comprising an internal bore (36) communicating with the central channel (32) of the part in the form of a glove finger, in which projection is fixed a temperature-measuring probe (39) carried by a support (38) ensuring the sealed closure of the bore of the projection (34) fixed to the outer surface of the hot leg (16), said projection comprising a channel (41) opening out into its bore (36) and brought into communication with a pipe (24) connected at its other end to the reintroduction element (22).

8. Device according to claim 6 or 7, wherein the reintroduction element (22) consists of a projection (46) fixed to the outer surface of the hot leg (16) in the region of an opening (45) traversing the wall of the hot leg (16) and comprising a bore (48) communicating with the opening (45) in which is fixed a temperature probe (51) on a support (50) ensuring the sealed closure, towards the outside, of the bore (48) of the projection (46), said projection (46) comprising at least three radial channels (52) opening out into the bore (48) of the projection (46), each of said channels communicating with a pipe (24, 25, 26) connected to a sampling device (19, 20, 21).

9. Device according to claim 8, wherein the support (50) arranged in the bore (48) of the projection (46) of the reintroduction element (22) is replaced by a plug closing the bore (48) of the projection (46).

10. Device according to claim 7, wherein the reintroduction element (22) consists of a projection (46) fixed to the outer surface of the hot leg (16) in the region of an opening (45) traversing the wall of the hot leg (16) and comprising a bore (48) communicating with the opening (45) in which is fixed a temperature probe (51) on a support (50) ensuring the sealed closure, towards the outside, of the bore (48) of the projection (46), the projection (46) furthermore comprising at least three channels (51) of radial direction opening out into the bore (48) of the projection (46), each communicating with a pipe (24, 25, 26) connected to a sampling device (19, 20, 21).

* * * * *